United States Patent
Yanagisawa

(10) Patent No.: US 6,849,283 B2
(45) Date of Patent: Feb. 1, 2005

(54) PROCESS FOR PRODUCING JUICE FROM BUCKWHEAT BUDS AND FLOWERS

(76) Inventor: Kikuji Yanagisawa, 1628, Coaza Nakano, Nakano-shi, Nagano 383-0013 (JP)

( * ) Notice: Subject to any disclaimer, the term of this patent is extended or adjusted under 35 U.S.C. 154(b) by 75 days.

(21) Appl. No.: 10/416,799

(22) PCT Filed: Nov. 9, 2001

(86) PCT No.: PCT/JP01/09853
§ 371 (c)(1),
(2), (4) Date: May 15, 2003

(87) PCT Pub. No.: WO02/39836
PCT Pub. Date: May 23, 2002

(65) Prior Publication Data
US 2004/0105916 A1 Jun. 3, 2004

(30) Foreign Application Priority Data
Nov. 15, 2000 (JP) ........................................ 2000-348163

(51) Int. Cl.⁷ .............................. A23L 2/38; A23F 3/00
(52) U.S. Cl. ............................. 426/51; 426/52; 426/599
(58) Field of Search ............................. 426/51, 52, 599

(56) References Cited

U.S. PATENT DOCUMENTS 6,596,322 B2 * 7/2003 Meng et al. ................. 424/725

FOREIGN PATENT DOCUMENTS

| JP | 61-192271 A |   | 8/1986 |
|----|-------------|---|--------|
| JP | 04 335879 A | * | 11/1992 |
| JP | 9-154549 A  |   | 6/1997 |
| JP | 9-206010 A  |   | 8/1997 |
| JP | 10-84891 A  |   | 4/1998 |
| JP | 2001-16986 A |  | 1/2001 |

OTHER PUBLICATIONS

Kreft et al., J. Agric. Food Chem., (1999), vol. 47, No. 11, pp. 4649–4652.

* cited by examiner

*Primary Examiner*—Keith Hendricks
(74) *Attorney, Agent, or Firm*—Birch, Stewart, Kolasch & Birch, LLP

(57) ABSTRACT

A juice-type drink, which is rich in the medicinal components of buckwheat, can be easily taken and has a favorable appearance in a pink color, is produced by using a press juice obtained from young buds or flowers of buckwheat.

Young buds or flowers of buckwheat are pressed. The press juice thus obtained is once frozen and then thawed followed by fermentation at ordinary temperature with lactic acid bacteria and yeasts. A pink supernatant is separated to give a buckwheat bud/flower juice. By once freezing and then thawing the press juice spontaneously undergoes the fermentation with lactic acid bacteria and yeasts and thus the pink supernatant can be separated out.

8 Claims, 1 Drawing Sheet

PROCESS FOR PRODUCING JUICE FROM BUCKWHEAT BUDS AND FLOWERS

FIELD OF TECHNOLOGY

The present invention relates to a process for producing juice from buckwheat buds and flowers.

CONVENTIONAL TECHNOLOGY

Press juices (green juices), which are made by breaking and pressing leaves and stems of plants, are known as drinks including several medicinal components. Green juices are made from not only medicinal plants but also vegetables, e.g., spinach, cabbage, cucumber, carrot, parsley, celery, and the juices can be easily produced by, for example, a mixer.

The inventor of the present invention has studied a process for cultivating young buds of buckwheat (buckwheat sprouts), and he mass-produces buckwheat sprouts and supplies them to markets. Buckwheat sprouts germinate in a dark place, and they are cut when their stems extend to 10 cm or so. By irradiating lights, the stems of the buckwheat sprouts become pink so that the buckwheat sprouts have favorable appearances, further they are very delicious with good tooth resistance, so the buckwheat sprouts are used for eating raw, etc.

Buckwheat is known as food, which is rich in the medicinal components, e.g., rutin, buckwheat sprouts also include the medicinal components as well, but we have to eat a large amount of buckwheat sprouts every day so as to get medicinal effects. The inventor produced a green juice made from buckwheat sprouts so as to effectively ingest the medicinal components of buckwheat.

As described above, green juices can be easily made by breaking and pressing leaves and stems of plants. In the case of a juice made from buckwheat sprouts too, buckwheat sprouts can be easily broken by, for example, a mixer so as to make the press juice thereof. However, by breaking buckwheat sprouts, which are white or pink and have small seed leaves, with the mixer and pressing the broken buckwheat sprouts, the press juice becomes dark green and has grassy-smelling as well as other juices made from vegetables, therefore it is hard to drink the mere buckwheat sprout juice, and merchandize value of the juice must be low.

As described above, press juices made from plants include much medicinal components, but they are hard to drink, thus they are, for example, formed into dry powders so as to easily drink.

In the case of the green juice which is made by merely breaking and pressing buckwheat sprouts, the green juice is grassy-smelling and hard to drink, thus the inventor studied various treatments and found the process for producing the buckwheat sprout juice which is good to drink.

Namely, an object of the present invention is to provide a process for producing a juice from buckwheat sprouts, which includes much nutritive and medicinal components of buckwheat sprouts, which is good to drink and which has a pink color of the buckwheat sprouts unlike conventional green juices; and another object is to provide a process for producing a juice from buckwheat flowers.

DISCLOSURE OF THE INVENTION

To achieve the objects, the present invention has following constitutions.

Namely, the process for producing a juice from buckwheat buds comprises the steps of: pressing buckwheat buds so as to make a press juice; freezing the press juice; thawing the frozen press juice; fermenting the thawed press juice with lactic acid bacteria and yeasts at ordinary temperature; and separating a supernatant of the fermented press juice.

In the process, the press juice is refrigerated for several days before the freezing step.

In the process, the supernatant is pasteurized at low temperature after the separating step.

The best feature of the process for producing the juice from buckwheat buds is once completely freezing the press juice, which is made from buckwheat buds, and thawing the frozen press juice. By freezing and thawing the press juice, propagation of bacteria can be prevented, and the thawed press juice can be effectively fermented with lactic acid bacteria and yeasts. By fermenting the thawed press juice with lactic acid bacteria and yeasts after the thawing step, the green juice is gradually divided into a pink layer, a gray layer under the pink layer and a green layer. The fermentation of the press juice with lactic acid bacteria and yeasts is indicated by forming bubbles in the juice (the fermentation with yeasts) and whitening a surface of the juice (the fermentation with lactic acid bacteria).

The pink supernatant has sweet flavor unlike green juices, so it is good for everyone to drink. Since the pink supernatant includes much potassium, the supernatant becomes pink. The supernatant is separated from the juice and pasteurized, and the pasteurized supernatant is provided as the buckwheat bud juice.

Note that, in the process of the present invention, vitamin C may be added to the press juice after the pressing step so as to prevent oxidization, and the press juice may be refrigerated for about 3 days at temperature of 5° C.–10° C. before the freezing and thawing steps so as to easily extract essences of buckwheat.

The buckwheat bud juice of the present invention is made from young buds of buckwheat, so it is rich in the medicinal components of buckwheat, e.g., rutin, potassium, vitamins, it is a liquid easily absorbed into human bodies, the essences of buckwheat are condensed in it, therefore it can be provided as a highly medicinal drink. The buckwheat bud juice is effective for calming allergic skin diseases, reducing blood pressure, reducing blood sugar level, etc. Further, the buckwheat bud juice has a good appearance with pink color, so its merchandize value is high.

The buckwheat flower juice can be produced as well as the buckwheat bud juice. The process for producing a juice from buckwheat flowers comprises the steps of: pressing buckwheat buds with water so as to make a press juice; freezing the press juice; thawing the frozen press juice; fermenting the thawed press juice with lactic acid bacteria and yeasts at ordinary temperature; and separating a pink supernatant of the fermented press juice. The pink supernatant has sweet flavor unlike green juices, so it is good to drink. In the case of the buckwheat flower juice too, the press juice may be refrigerated for several days so as to extract nutritive components. Further, the supernatant is pasteurized at low temperature after the separating step. Amount of rutin included in the buckwheat flower juice is 150 times as much as that included in the buckwheat bud juice, so the buckwheat flower juice is a drink having higher medicinal effects.

PREFERRED EMBODIMENTS OF THE INVENTION

Figure 1:
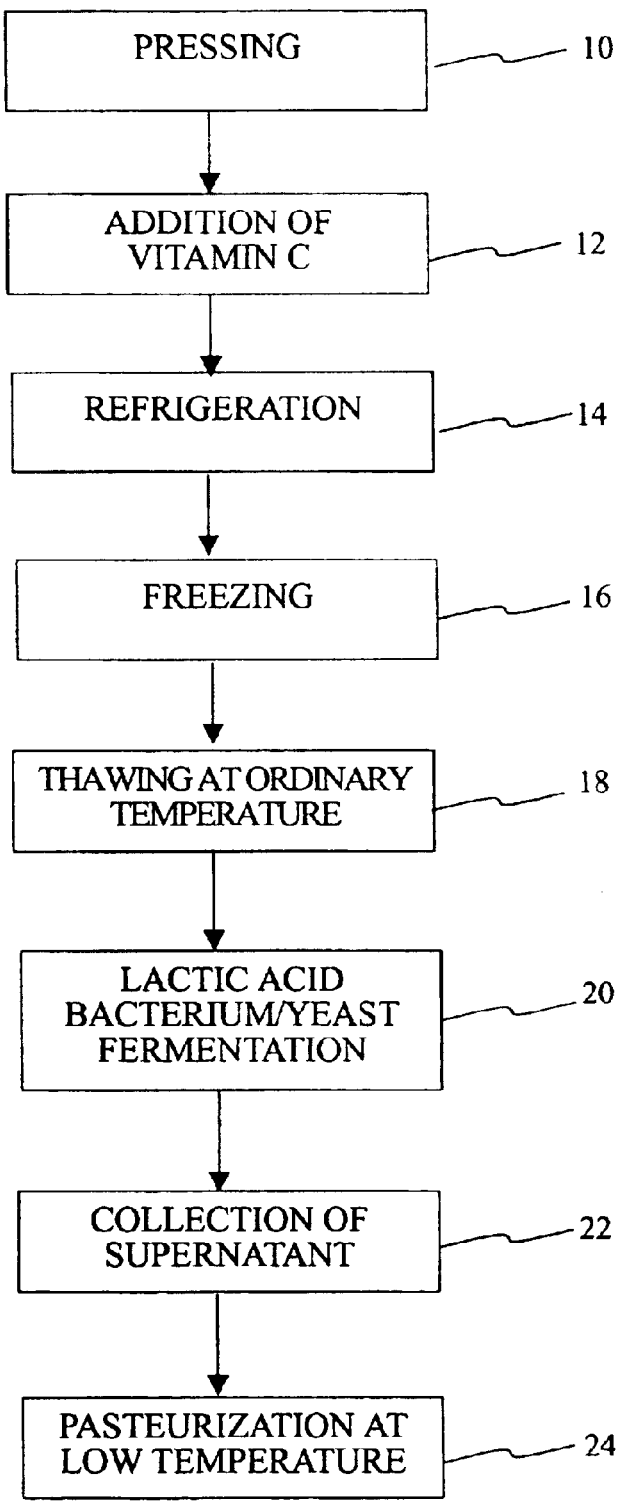
FIG. 1 is a flow chart of the process for producing a juice from buckwheat buds.

Preferred embodiments of the process for producing the buckwheat bud juice of the present invention will now be described with reference to the flow chart of FIG. 1.

In the process of the present invention for producing the (buckwheat sprout) juice from buckwheat buds (buckwheat sprouts), a press juice of buckwheat buds is treated to produce a juice-type drink.

The buckwheat sprouts are cut when their stems extend to 10 cm or so, and their stems and seed leaves are used except roots. The stems of the buckwheat sprouts are whitish or light pink.

When buckwheat sprouts are pressed so as to produce a press juice, firstly the buckwheat sprouts are cleaned, then they are broken by a mixer and pressed by press means. Strained lees, e.g., leaves, are removed from the press juice by a mesh (STEP 10).

The press juice of about 800 cc is produced from the buckwheat buds of 1 Kg. As described above, the press juice is dark green, and it is hard to drink with grassy smell. Note that, in the following steps, the pure press juice is used without adding water.

After the press juice is produced, a lemon juice is added to the press juice (STEP 12). By adding natural vitamin C, other vitamins can be easily absorbed and oxidization of the juice can be prevented. For example, the lemon juice of about 8 cc is added to the press juice of 800 cc.

Next, the pressed juice including the lemon juice is stored in a container and refrigerated for about 3–4 days at temperature of 5° C.–10° C. (STEP 14). By refrigerating the press juice, propagation of bacteria can be prevented, solid matters in the press juice can be separated and essences (nutritive components) of the press juice can be further extracted. By refrigerating and storing the press juice, solid matters deposit on a bottom of the container.

While the press juice is refrigerated, fermentation of the press juice with lactic acid bacteria and yeasts begins. The fermentation is executed by lactic acid bacteria and yeasts which have stuck on the buckwheat sprouts.

After refrigerating the press juice for 3–4 days, the press juice is once completely frozen (STEP 16). By completely freezing the press juice, the fermentation with lactic acid bacteria and yeasts stops, and propagation of other bacteria can be prevented. In the present embodiment, the press juice is frozen, in a freezer, at temperature of −25° C. The freezing temperature is not limited. A required time for completely freezing the press juice depends on the amount of the press juice; the press juice of the present embodiment is completely frozen by freezing for one day.

After the press juice is completely frozen, the frozen press juice is thawed (STEP 18). By freezing the press juice, quality of the press juice can be maintained. Period of freezing the press juice is not limited; in the present embodiment, the press juice is thawed after one day elapsed from the complete freeze.

The container storing the frozen press juice is taken out from the freezer, and the frozen press juice is thawed at room temperature.

When the press juice is thawed, the fermentation with lactic acid bacteria and yeasts begins in the thawed juice again (STEP 20). The fermentation is executed by lactic acid bacteria and yeasts which have left in the press juice. Buckwheat includes many lactic acid bacteria and yeasts, and the inventor thinks that the fermentation with lactic acid and yeasts is executed by unique function of buckwheat. The fermentation of the press juice with lactic acid bacteria and yeasts is known by observing bubbles in the juice.

The thawing the press juice is executed in the container, so the press juice is gradually thawed from edges encased by the contain. The fermentation with lactic bacteria and yeasts begins in the firstly thawed part of the press juice, and the fermentation is executed in the whole press juice when the press juice is completely thawed. The fermentation is executed by lactic acid bacteria and yeasts which have stuck on buckwheat sprouts, and a pink supernatant is gradually separated in an upper part of the press juice by fermentation with lactic acid bacteria and yeasts.

Amount of the pink supernatant is gradually increased with progress of the fermentation, so that progress of separation can be known. By separating the pink supernatant, sweet smell exceeds grassy smell.

With progressing the fermentation with lactic acid bacteria and yeasts, the pink supernatant, which is the upper layer of the press juice, occupies about four fifth of the volume of the press juice; the rest is a gray layer. To collect the pink supernatant, a period of the fermentation with lactic acid bacteria and yeasts after thawing the press juice is from 3 days to 3 weeks or so. The period of fermentation highly depends on temperature and humidity. Therefore, time of collecting the pink supernatant may be determined on the basis of the progress of the fermentation (STEP 22).

By the fermentation with lactic acid bacteria and yeasts, the supernatant becomes pink, which is the same color as stems of buckwheat sprouts have, and sweet, so that it becomes a delicious drink. Since the supernatant includes much potassium, the supernatant becomes pink.

After the pink supernatant is collected, the fermentation with lactic acid bacteria and yeasts is stopped, then the supernatant is pasteurized at low temperature so as not to propagate bacteria; the buckwheat bud juice is completed (STEP 24). The pasteurization is executed by heating the supernatant for 60–90 seconds at temperature of 75° C.–85° C. The heat-pasteurized juice is bottled for sale.

Since the buckwheat bud juice is made from the press juice of buckwheat buds, the sweet buckwheat bud juice includes much nutritive components and medicinal components of buckwheat, so it can be provided as an easy-drinkable drink. Further, the color of the buckwheat bud juice is pink, so its appearance is also nice.

EXAMPLES

Experimental examples of the juice made from buckwheat buds and buckwheat flowers will be explained.

Example 1

Conditions of a press juice, to which prescribed treatment was executed, according to time elapsed are shown in TABLE 1.

TABLE 1

| Day | Color | Separating condition | Fermentation | Smell | Color of solid matters | Treatment |
| --- | --- | --- | --- | --- | --- | --- |
| 1 | Green | None | None | Chlorophyll | Green | Refrigeration |
| 2 | Green | None | None | Chlorophyll | Green | Refrigeration |
| 3 | Green/Flesh color | None | Bubbles | Chlorophyll | Green | Refrigeration |
| 4 | | | | | Green | Freezing |

TABLE 1-continued

| Day | Color | Separating condition | Fermentation | Smell | Color of solid matters | Treatment |
|---|---|---|---|---|---|---|
| 5 | Pink | 2/5 | None | Sweet-sour | Whitish | Thaw |
| 6 | Pink | 3/5 | Fermentation observed | Sweet | White | Thaw |
| 7 | Pink | 4/5 | Fermentation observed | Sweet | White | Thaw |
| 8 | | | No Bubbles | | | Pasteurization |

In the TABLE 1, the item "Day" indicates days elapsed from producing the press juice. After the press juice was produced, the press juice was stored in a refrigerator (temperature 7° C.). When 2 days elapsed, the whole press juice was green and had grassy smell of chlorophyll.

On the third day, bubbles in the press juice were observed. The color of the press juice was green and partially flesh color. No separation was observed in the press juice.

When 3 days elapsed, the press juice was stored in a freezer whose temperature was −25° C. so as to freeze the press juice. On the fourth day, the freezing period is one day.

On the fifth day, the container storing the press juice was taken out from the freezer to thaw the press juice. The separation began in the thawed part of the press juice, and two fifth of the press juice was separated at the end of the fifth day. The separated part of the juice became pink, and the press juice had sweet-sour smell. Solid matters in the press juice became whitish.

On the sixth day, bubbles in the press juice were observed. Smell of the press juice became sweet. The press juice was fermented by lactic acid bacteria and yeasts. When the press juice was completely thawed, about three fifth of the press juice was separated, and the supernatant became pink. The solid matters in the press juice became white.

On the seventh day, since bubbles were actively formed in the press juice, the progress of the fermentation with lactic acid bacteria and yeasts were observed. The smell of the press juice became sweeter. About four fifth of the press juice was separated, and the supernatant became pink. The solid matters in the press juice became white.

On the eighth day, the supernatant was collected and pasteurized at low temperature. By the pasteurization, no bubbles were observed, and the pink buckwheat bud juice was completed.

Comparative Example

Conditions of a press juice, which was produced by pressing buckwheat buds and refrigerating the press juice without freezing, according to time elapsed are shown in TABLE 2.

TABLE 2

| Day | Color | Separating condition | Fermentation | Smell | Color of solid matters | Treatment |
|---|---|---|---|---|---|---|
| 1 | Green | None | None | Chlorophyll | Green | Refrigeration |
| 2 | Green | None | None | Chlorophyll | Green | Refrigeration |
| 3 | Green/Flesh color | None | Bubbles | Chlorophyll | Green | Refrigeration |
| 4 | Gray | Upper part separated | Film formed partially | Chlorophyll | Green | Refrigeration |
| 5 | Flesh color | 1/5 | Film formed wholly | Sweet-sour | Green | Refrigeration |
| 6 | Flesh color | 2/5 | White, Bread mold | Stink | Green | Refrigeration |
| 7 | Dark flesh color | 3/5 | White, Bread mold increased | Stink | Whitish | Refrigeration |
| 8 | Pink | 4/5 | White, Bread mold 50% | Stink | White 50% | Refrigeration |
| 9 | Light pink | 4/5 | Bread mold 80% | Stink | White 90% | Refrigeration |

On the third day from producing the press juice, bubbles were observed. At that time, solid matters were not clearly separated, and the press juice had grassy smell of chlorophyll.

On the fourth day, an upper part of the press juice was separated. A film was formed on a part of the surface of the separated liquid part. The press juice had grassy smell of chlorophyll.

On the fifth day, the upper part, which was one fifth of the press juice, was separated from solid matters, and the separated liquid part became flesh color. The film covered the whole surface of the separated liquid part. The press juice had sweet smell.

On the sixth day, the upper part, which was two fifth of the press juice, was separated from the solid matters. The separated liquid part was flesh color. Bread mold gathered on the surface of the separated liquid part. The press juice had stink.

On the seventh day, the upper part, which was three fifth of the press juice, was separated from the solid matters. The separated liquid part was dark flesh color. Bread mold was increased. The solid matters became whitish, and the press juice had stink.

On the eighth day, the upper part, which was four fifth of the press juice, was separated from the solid matters. The separated liquid part was pink. Bread mold covered 50% of the surface of the separated liquid part. The solid matters became white. The press juice had stink.

On the ninth day, the separated liquid part was light pink, and bread mold covered 80% of the surface of the separated liquid part. 90% of the solid matters became white. The press juice had stink. The experiment was stopped on the ninth day.

According to the results of the comparative example, the fermentation with lactic acid bacteria and yeasts is once executed in the press juice, which is made from buckwheat buds and merely refrigerated, but the fermentation does not continue, so that the press juice decomposes. In the present invention, the press juice is frozen and thawed, so that the fermentation with lactic acid bacteria and yeasts can be continuously executed, therefore these steps are highly effective for producing the buckwheat juice. The inventors repeated experiments of freezing and thawing the press juice made from buckwheat buds, so that he confirmed that the process of the present invention is capable of easily producing the buckwheat juice.

Example 2

Conditions of press juices, one of which was produced by pressing buckwheat buds without freezing and the other of which was produced by pressing buckwheat buds and freezing, according to time elapsed are shown in TABLE 3.

TABLE 3

|  | Not frozen | | Frozen and thawed | |
| --- | --- | --- | --- | --- |
| Time elapsed | Temperature | Condition | Temperature | Condition |
| 1 hour | 5° C. | Good | 1° C. | Grassy smell |
| 3 hours | 25° C. | Decomposition smell | 23° C. | Smell of yeasts |
| 6 hours | 35° C. | Decomposition began | 26° C. | Yeasts work actively |
| 18 hours | 48° C. | Decomposition progressed | 28° C. | Film of bacteria formed |
| 24 hours | 52° C. | Completely decompressed | 28° C. | Sweet smell |

Note that, the process of the present example including the freezing step and the thawing step is the process of the present invention; the other process including no freezing step is a comparative example.

In the case of producing a press juice from buckwheat flowers, water whose weight is nearly equal to that of the buckwheat flowers is added, then the buckwheat flower are pressed together with water. Buckwheat flowers include about 50% of water; by adding water, the press juice can be produced easily. Preferably, water is added to buckwheat flowers collected, and they are refrigerated. Note that, buckwheat flowers, to which water has been added, may be frozen and thawed before pressing the flowers.

The buckwheat flowers, to which water had been added, was pressed by a pressing apparatus to produce the press juice. The press juice was green. In the case of using buckwheat flowers too, the press juice may be once stored and refrigerated so as to easily extract essences (nutritive components) of buckwheat flowers. In the present example, the press juice was frozen and stored for one day, then the press juice was thawed. In the case of using buckwheat flowers too, the press juice should be completely frozen, preferably the press juice is frozen and stored for about one day. In the TABLE 3, "Frozen and thawed" means that the frozen press juice made from the buckwheat flowers was thawed, and the completely thawed juice was maintained at the room temperature; the progress observed is shown in the table. On the other hand, "Not frozen" means that the buckwheat flowers were pressed together with water whose temperature was 4° C., and the press juice was maintained at the room temperature; the progress observed is shown in the table.

As shown in the TABLE 3, progresses of the press juice, which was once frozen, thawed and maintained at room temperature, and another press juice, which was merely maintained at room temperature, are quite different. Namely, in the process without freezing step, the press juice discomposed with lapse of time; in the process with the freezing step and the thawing step, the buckwheat juice was produced by fermentation with lactic acid bacteria and yeasts without decomposition. A pink supernatant layer was formed in an upper part of the press juice as well as the juice made from buckwheat buds. The pink supernatant was sweet and became an easily drinkable juice. Amount of rutin included in the buckwheat flower juice was 150 times as much as that included in the buckwheat bud juice. The reason is that amount of rutin included in buckwheat flower is much greater than that included in buckwheat buds.

EFFECTS OF THE INVENTION

In the process of the present invention, in which the buckwheat juice is produced from buckwheat buds and flowers, as described above, buckwheat buds or buckwheat flowers are used as materials, the materials are pressed to produce the press juice, the press juice is treated with the prescribed steps to execute the fermentation with lactic acid bacteria and yeasts, so that the juice-type drink can be produced from the press juice made from buckwheat buds or buckwheat flowers, which is hard to drink. Since the buckwheat bud juice and the buckwheat flower juice include much medicinal components, e.g., rutin, potassium, which are originally included in buckwheat, they can be properly provided as healthy drinks including much medicinal components. Since the juice has good pink appearance, its merchandise value can be made higher. Further, the buckwheat juice can be easily mass-produced by the process of the present invention.

What is claimed is:

1. A process for producing a juice from buckwheat buds, comprising the steps of:
   pressing buckwheat buds so as to make a press juice;
   freezing said press juice;
   thawing said frozen press juice;
   fermenting said thawed press juice with lactic acid bacteria and yeasts at ordinary temperature; and separating a supernatant of said fermented press juice.

2. The process for producing a juice from buckwheat buds according to claim 1, wherein said press juice is refrigerated for several days before said freezing step.

3. The process for producing a juice from buckwheat buds according to claim 1, wherein said press juice is refrigerated for one day before said freezing step.

4. The process for producing a juice from buckwheat buds according to claim 1, wherein said supernatant is pasteurized at low temperature after said separating step.

5. A process for producing a juice from buckwheat flowers,
   comprising the steps of:
   pressing buckwheat flowers with water so as to make a press juice;
   freezing said press juice;
   thawing said frozen press juice;
   fermenting said thawed press juice with lactic acid bacteria and yeasts at ordinary temperature; and separating a supernatant of said fermented press juice.

6. The process for producing a juice from buckwheat flowers according to claim 5, wherein said press juice is refrigerated for several days before said freezing step.

7. The process for producing a juice from buckwheat buds according to claim 5, wherein said press juice is refrigerated for one day before said freezing step.

8. The process for producing a juice from buckwheat buds according to claim 5, wherein said supernatant is pasteurized at low temperature after said separating step.

* * * * *